No. 755,882. PATENTED MAR. 29, 1904.
C. E. JONES.
WHIFFLETREE HOOK.
APPLICATION FILED JAN. 4, 1904.
NO MODEL.
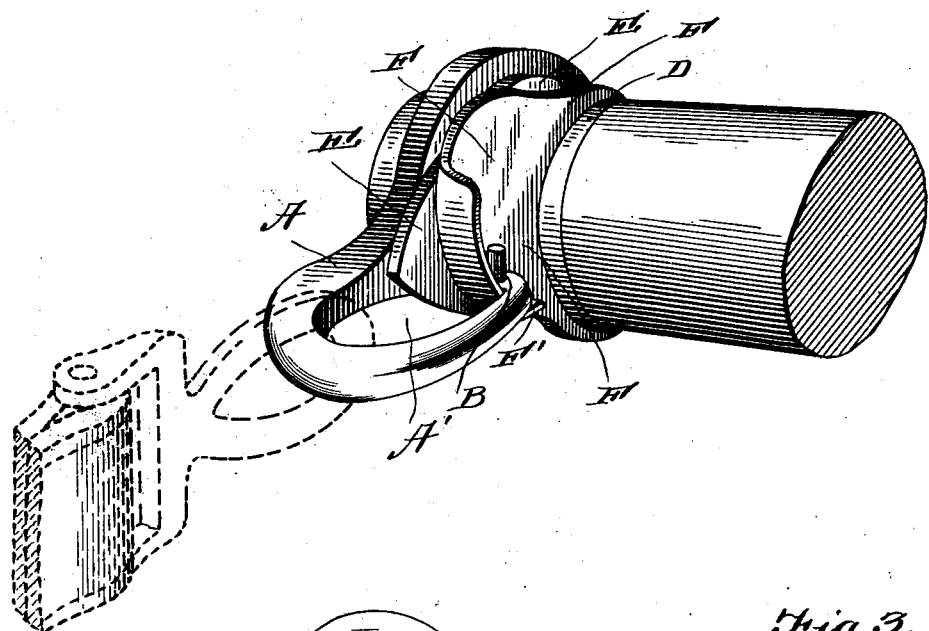
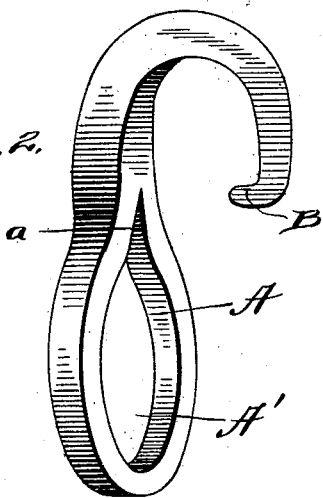
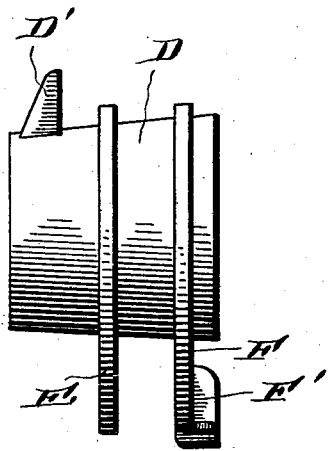
Witnesses
R. A. Boswell
A. L. Hough
Inventor
Charles E. Jones,
By Franklin H. Hough
Attorney No. 755,882.

Patented March 29, 1904.

UNITED STATES PATENT OFFICE.

CHARLES E. JONES, OF WINDSOR, MISSOURI.

WHIFFLETREE-HOOK.

SPECIFICATION forming part of Letters Patent No. 755,882, dated March 29, 1904.

Application filed January 4, 1904. Serial No. 187,749. (No model.)

*To all whom it may concern:*

Be it known that I, CHARLES E. JONES, a citizen of the United States, residing at Windsor, in the county of Henry and State of Missouri, have invented certain new and useful Improvements in Whiffletree-Hooks; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in whiffletree-hooks; and the object of the invention is to produce a hook for swingletrees or doubletrees in which the draft is thrown on the free end of the hook as well as on the base, making a substantial clevis-pole.

The invention consists, further, in various details of construction and arrangements of parts, which will be hereinafter fully described, and then specifically defined in the appended claims.

My invention is illustrated in the accompanying drawings, which, with the letters of reference marked thereon, form a part of this application, and in which drawings—

Figure 1 is a perspective view of my improved whiffletree-hook shown as connected to an end of a swingletree. Fig. 2 is a detail view of the hook. Fig. 3 is a detail view of a sleeve or collar on which the hook is mounted.

Reference now being had to the details of the drawings by letter, A designates a hook made of a single piece of metal having an aperture A' therein, and a recess $a$ is formed in the wall of said aperture, the apex of the recess extending into the shank portion of the hook, as shown in the drawings. One end of the shank portion of said hook is curved, as shown in the detail view, and is bent at an angle, forming a lug B.

The collar D, which is adapted to be fastened on the end of a swingletree, has a lug D' projecting from the circumference thereof adjacent to one end. The two flanges (designated by letters E and F) are formed upon the circumference of the sleeve D and spaced apart. One of said flanges, E, is provided for the purpose of preventing the inner throw of the hook when placed upon the sleeve, and the other of said flanges, F, is provided with an angled or turned edge F', adapted to receive the lug or point B of the hook, as shown in Fig. 1 of the drawings, the ends of said angled or turned portion F' serving to prevent the hairs of the tail of a horse from catching upon the hook when the clevis is connected to the harness.

In adjusting the hook in place upon the sleeve the apertured portion A' thereof is caught over the integral lug D' and after which the lug D' is turned over the shank portion of the hook, thereby securely holding the hook in place upon the sleeve. The lug D' when thus turned into a position to retain the hook upon the sleeve serves as a stop to limit the swinging movement of the hook upon the sleeve in one direction.

From the foregoing it will be observed that by the provision of the novel construction of whiffletree-hook comprising two sections made of any suitable metal and held together in the manner described an efficient hook is provided whereby the free end of the hook will be securely locked in the flanged portion of the sleeve and the draft is thrown upon the free end of the hook as well as on the base having the substantial clevis-pole.

My invention, which is shown as applied to a swingletree of ordinary construction, may be applied to various swingletrees, and it will be understood that the shape of the parts may be varied in different manners for the purpose of adapting the invention to different conditions without in any way departing from the spirit of the invention.

Having thus described my invention, what I claim as new, and desire to secure by Letters Patent, is—

1. A whiffletree-hook comprising a metallic sleeve adapted for attachment to the end of a swingletree and having flanges upon its circumference, a hook having an apertured end fitted over said sleeve and retained in place thereon by means of an integral lug upon the sleeve, the free end of said hook adapted to engage a flange upon the sleeve to hold the same in a locked relation, as set forth.

2. A whiffletree-hook comprising a metallic sleeve adapted for attachment to the end of a swingletree, provided with two flanges spaced apart, and an integral lug, a hook having an apertured end adapted to be fitted over said sleeve and retained thereon by said lug being bent over the edge of the apertured end of the hook, one of said flanges having an angled or bent end adapted to receive the point of said hook, as set forth.

3. A whiffletree-hook comprising a metallic sleeve, adapted for attachment to the end of a swingletree, flanges integral with said sleeve and spaced apart, and an integral lug projecting from the circumference of the sleeve, combined with a hook having an apertured end, a recess therein adapted to receive said lug, one of said flanges adapted to prevent the inner throw of the hook, and said lug designed to be bent over the apertured end of the hook to retain the same upon the sleeve, one of said flanges having a portion thereof bent at an angle to receive the free end of said hook, as set forth.

In testimony whereof I hereunto affix my signature in presence of two witnesses.

CHARLES E. JONES.

Witnesses:
F. C. LIVINGSTON,
ROSS E. FEASTER.